United States Patent Office 3,161,767
Patented Dec. 15, 1964

1

3,161,767
FLUID FLOW MEASUREMENT METHOD

Bernard A. Fries, Orinda, Calif., assignor to California Research Corporation, San Francisco, Calif., a corporation of Delaware No Drawing. Filed Dec. 1, 1961, Ser. No. 156,498
2 Claims. (Cl. 250—43.5)

This invention relates to an improved method for measuring fluid flow rates with the aid of radioactive tracer materials.

U.S. Patents 2,826,699 and 2,826,700 describe method and apparatus for measuring the rate of fluid flow using radioactive materials, which is growing in use and which has become generally known as the "total count method."

While the total count method, as described in the patents above referred to, provides an excellent means for measuring the rate of fluid flow in a variety of situations where reasonably accurate measurement would be extraordinarily complicated or prohibitively expensive by other methods, there are situations in which the total count method, if it is to be used, requires the employment of extraordinarily large quantities of radioactive material.

It is the object of this invention to provide a method for measuring fluid flow rate through the employment of radioactive materials in which very much smaller amounts of radioactive material are required in connection with the measurement than would be required if the total count method were employed.

It is a further object of this invention to provide a method for measuring fluid flow rate through the employment of radioactive materials that do not emit penetrating radiations and consequently cannot be detected and measured during their use. By the method of this invention, such radioactive materials as hydrogen-3 (tritium) and carbon-14, which emit very weak $\beta$-radiations, may be used in the flow measurements by later determining the radioactivity in the sample collected with more sensitive counting equipment.

Pursuant to this invention, a quantity of radioactive material is segregated and its radioactivity, in terms of counts per unit time detected by a radioactivity counter, is measured. This quantity of tracer is injected into the fluid stream. A sample is withdrawn from the fluid stream at a point downstream from the point of introduction of the radioactive material. The withdrawal of the sample is carried out at a constant rate and is continued for a measured time which includes the time during which all of the introduced radioactive material passes the withdrawal point. The number of counts emitted per unit time per unit volume by the sample is determined either with the same radioactivity counter employed in measuring the quantity of radioactive material introduced into the fluid stream under identical counting conditions or with another counter for which the correction factor necessary to convert its reading to correspond with that of the first used counter has been determined. The rate of flow of the fluid stream is then determining according to the following formula:

$$Q=C/RT$$

where Q is the rate of flow of the fluid, C is the quantity of radioactive material introduced into the fluid stream, expressed in counts per unit time detected by a radioactive disintegration counter, R is the number of counts per unit time per unit volume of the sample collected recorded by the same counter, and T is the time during which the sample is collected.

The method of the invention was employed in measuring the rate of flow of steam in a refinery steam line. Tritium, in the form of the compound HOT, was used as the radioactive material. The quantity of HOT employed in the measurement was such that it emitted $7.93\times10^7$ counts per second as measured by a radio activity counter. This quantity of the radioactive material was introduced into the steam line and a sample was withdrawn from the steam line at a point approximately 100 feet downstream from the point of introduction of the radioactive material. The sample was withdrawn at a constant rate in four equal parts, each of the four equal parts being the quantity of material collected during 100 seconds. The first and fourth 100-second samples each showed count rates of 5 counts per second when counted in the same liquid scintillation counter used in measuring the quantity of HOT employed in the test. This count was exactly equal to the background count and, therefore, no part of the introduced radioactive material was contained in either the first or fourth 100-second sample. The second and third 100-second samples which showed radioactivity above background were combined and their count rate was measured in the same liquid scintillation counter and found to be 257 counts per second per cubic centimeter. Q, the rate of fluid flow, was then calculated using the formula:

$$Q=C/RT$$

In the test, the value of C was $7.93\times10^7$ counts per second. The value of R was 257 counts per second per cc., and the value of T was 200 seconds. Using these values, Q was determined to be 1543 cubic centimeters per second, which may be expressed also as 12,240 pounds of steam per hour. This value checked well with the best gauge readings available for the line.

In a total count measurement, the total number of counts may be thought of as the product of the time required for the passage of the tracer and the average counting rate during that time. The statistical accuracy is limited to that defined by the total number of counts recorded; after the tracer has passed there are no more rays to count. In the method of this invention, counting of the sample can be continued as long as desired to determine R with any necessary statistical precision.

Suitable radioactive materials which may be employed are cesium-134, cesium-137, gold-198, antimony-124, cobalt-60, krypton-85, iodine-131, and tritium. These materials may be used as compounds which are soluble or uniformly dispersible in the fluids sought to be measured. The amount of radioactive material required for a test may range from a few microcuries to a number of curies, depending upon the volume of the flow and the purpose of the test. Any conventional radiation counter may be used in the practice of the invention, i.e., a geiger counter, proportional counter, or either crystal or liquid scintillation counters. The counter used in determining the total number of counts of radioactive material to be introduced into the fluid stream to be measured also is preferably used in counting the sample withdrawn downstream from the point of introduction of the radioactive material. However, a second counter may be used, provided the second counter has been cross-compared with the first counter and a calibration factor established which permits converting the reading of the second counter to correspond to that which would have been obtained had the first counter been used in both instances. Whether the same counter be used in both measurements, or a second counter for which a calibration factor has been established be used in the second measurement, will not affect the accuracy of the method, since in the second measurement the counter used is in any case one which has an adjusted response equivalent to that of the first counter. The sample withdrawn for counting should be withdrawn from the fluid stream at a point sufficiently well downstream from the point at which the radioactive material was introduced that uniform mixing of the radioactive material with the fluid stream laterally is assured; further, the sample should be withdrawn at a very uniform rate and the time during which the sample is collected must be accurately measured in order to obtain best results.

Having described the invention, I claim:

1. The method of determining the volume flow rate of fluid stream, which comprises measuring the radioactivity of a quantity of radioactive material in counts per unit time, C, detected by a radioactivity counter, introducing said quantity of radioactive material into said fluid stream, withdrawing a sample of said fluid from said fluid stream at a point downstream from the point of introduction of said radioactive material, the withdrawal being at a constant rate and continuing for a time, T, which includes the time during which the introduced radioactive material passes the withdrawal point, determining the number of counts per unit time per unit volume, R, of the sample detected by a radioactivity counter having a corrected response equivalent to that of the first mentioned counter, and determining the volume flow rate, Q, of said fluid stream according to the formula:

$$Q = C/RT$$

2. The method of determining the flow rate of a stream of steam, which comprises measuring the radioactivity of a quantity of tritiated water in counts per unit time, C, detected by a radioactivity counter, introducing said quantity of tritiated water into the stream of steam, withdrawing a sample of steam from the steam stream at a point downstream from the point of introduction of the tritiated water, the withdrawal being at a constant rate and continuing for a time, T, which includes the time during which the tritiated water passes the withdrawal point, determining the number of counts per unit time per unit volume, R, of the sample detected by a radioactivity counter having a corrected response equivalent to that of the first-mentioned counter and determining the flow rate, Q, of the steam stream according to the formula:

$$Q = C/RT$$

References Cited in the file of this patent

UNITED STATES PATENTS

| | | |
|---|---|---|
| 2,826,699 | Hull | Mar. 11, 1958 |
| 2,826,700 | Hull | Mar. 11, 1958 |
| 2,841,713 | Howard | July 1, 1958 |
| 2,945,127 | Hanson | July 12, 1960 |
| 2,968,721 | Shapiro et al. | Jan. 17, 1961 |